United States Patent
Jiang (10) Patent No.: US 7,041,167 B2
(45) Date of Patent: May 9, 2006

(54) LOW DENSITY ACCELERANT AND STRENGTH ENHANCING ADDITIVE FOR CEMENTITIOUS PRODUCTS AND METHODS OF USING SAME

(75) Inventor: Chongjun Jiang, Sydney (AU)

(73) Assignee: James Hardie International Finance B.V. (NL)

( * ) Notice: Subject to any disclaimer, the term of this patent is extended or adjusted under 35 U.S.C. 154(b) by 178 days.

(21) Appl. No.: 10/090,340

(22) Filed: Mar. 4, 2002

(65) Prior Publication Data

US 2002/0166479 A1 Nov. 14, 2002

Related U.S. Application Data

(60) Provisional application No. 60/273,761, filed on Mar. 5, 2001, provisional application No. 60/273,762, filed on Mar. 5, 2001, provisional application No. 60/273,764, filed on Mar. 5, 2001, and provisional application No. 60/273,766, filed on Mar. 5, 2001.

(51) Int. Cl.
*C04B 14/04* (2006.01)

(52) U.S. Cl. ............ 106/713; 106/600; 106/735; 106/737; 106/785; 106/819; 256/333; 256/DIG. 43

(58) Field of Classification Search ............ 106/600, 106/713, 735, 737, 785, 819; 264/333, DIG. 43 264/86, 87
See application file for complete search history.

(56) References Cited

U.S. PATENT DOCUMENTS 4,101,335 A * 7/1978 Barrable ............... 106/644
4,131,638 A   12/1978 Whitaker et al.
4,132,555 A * 1/1979 Barrable ............... 106/795

(Continued)

FOREIGN PATENT DOCUMENTS

| CN | 1120525 A | | 4/1996 |
|---|---|---|---|
| EP | 417418 A | | 7/1990 |
| EP | 0417418 A1 | * | 3/1991 |
| JP | 01318080 | * | 12/1989 |
| JP | 6-144944 A | | 5/1994 |
| JP | 06144944 | * | 5/1994 |
| JP | 2001028492 | * | 1/2004 |
| WO | WO 98/45222 | * | 10/1998 |
| WO | WO 00/21901 | * | 4/2000 |
| WO | WO 01/68547 | | 9/2001 |
| WO | WO 01/68547 A1 | * | 9/2001 |

OTHER PUBLICATIONS

JP 06144944 A2 "Method for Carbonating Porous Calcium Silicate Hydrate", Masaru, Asahi Chem.□□Ind Co. Ltd. (May 24, 1994). Abstract Only.*
EP 0417418 A1– "Ready Mix Mortar", Rosendahl et al., (Mar. 20, 1991). Abstract Only.*
Patent Abstracts of Japan abstract of JP 01318080, Motomura, Dec. 22, 1989.
Patent Abstracts of Japan abstract of JP 2001028492, Tamai et al., Jan. 30, 2001.
Patent Abstracts of Japan abstracts of JP 0138080, Molomura, Dec. 22, 1989.
Patent Abstracts of Japan abstract of JP 2001028492, Tamai et al., Jan. 30, 2001.

*Primary Examiner*—Paul Marcantoni
(74) *Attorney, Agent, or Firm*—Knobbe, Martens, Olson & Bear LLP (57) ABSTRACT

Disclosed are concrete and fiber cement formulations and products comprising low-density calcium silicate hydrate, and methods for producing these formulations and products. The disclosed formulations exhibit accelerated curing times. Other advantages of the disclosed formulations include improved dimensional stability in extruded products, reduced cracking, and reduced wash-out in underwater applications. The products of the disclosed formulation have lower cost of production and faster time to market.

85 Claims, 4 Drawing Sheets

U.S. PATENT DOCUMENTS

| | | |
|---|---|---|
| 4,162,924 A | 7/1979 | Kubo |
| 4,680,059 A | 7/1987 | Cook et al. |
| 4,689,084 A | 8/1987 | Ambroise et al. |
| 5,330,573 A | 7/1994 | Nakano et al. |
| 5,372,640 A | 12/1994 | Schwarz |
| 5,372,678 A | 12/1994 | Sagstetter et al. |
| 5,383,967 A * | 1/1995 | Chase ................... 106/737 |
| 5,709,743 A * | 1/1998 | Leture et al. ............ 106/713 |
| 6,139,620 A | 10/2000 | Suzuki et al. |
| 6,346,146 B1 * | 2/2002 | Duselis et al. ........... 106/713 |
| 6,506,248 B1 * | 1/2003 | Duselis et al. ........... 106/713 |
| 6,572,697 B1 * | 6/2003 | Gleeson et al. .......... 106/705 |
| 6,676,745 B1 * | 1/2004 | Merkley et al. .......... 106/726 |

\* cited by examiner

LOW DENSITY ACCELERANT AND STRENGTH ENHANCING ADDITIVE FOR CEMENTITIOUS PRODUCTS AND METHODS OF USING SAME

RELATED APPLICATIONS

This application claims priority to Application Ser. No. 60/273,761, filed Mar. 5, 2001, Application Ser. No. 60/273,762, filed Mar. 5, 2001, Application Ser. No. 60/273,764, filed Mar. 5, 2001, and application Ser. No. 60/273,766, filed Mar. 5, 2001, the entire disclosures of which are incorporated by reference.

FIELD OF THE INVENTION

The present disclosure relates to cementitious formulations, products, and methods of preparing the same, and in particular, cementitious formulations with accelerated curing.

BACKGROUND OF THE INVENTION

Despite advances in the production of early-setting, high-strength cements, the development of Portland-type cements with even greater compressive strengths and higher rates of strength development would be highly beneficial to the cement and the construction industries. For example, producing pre-cast, pre-stressed, concrete products with compressive strengths on the order of 4000–5000 psi often requires at least three hours or more.

Additionally, the construction and repair of highways, bridges, and freeway overpasses requires many days and even weeks of curing time before these structures set to sufficient compressive strengths to support their anticipated loads so that they may be utilized as designed. The resulting delays are a significant component of construction costs, which are compounded by increased transportation costs and shipping delays while critical transportation corridors are shut down waiting for concrete to harden.

Moreover, in the construction of concrete buildings, in which the cement matrix is cast into forms, days of curing time are necessary to allow the cement to develop sufficient strength before the forms may be removed. Such delays result in lost revenues for property owners, as well as inconvenience and storage costs for industrial tenants. Furthermore, setting rates of Portland-type cements can be affected by temperature. An early setting, ultra-high strength cement with a lower heat of hydration would make the production of large, complex superstructures possible at low ambient temperatures and would be an even greater contribution to the construction industry.

Many cement-based products are also mass manufactured in high-throughput factory situations. The time that it takes for cement to cure or set completely adds to the cost and difficulty of manufacturing. In particular, fiber cement products are manufactured in this way, by processes such as the Hatschek process, the Mazza process, or by extrusion. When a fiber cement product is formed in its "green" state, it typically must set for 8 to 12 hours ("precure") before additional processing or handling can occur. Precuring requires warehouse space as green products accumulate while setting, which adds to the cost of the manufacturing process. Consequently, there is a strong business motivation to reduce the curing time of cement, and in particular, fiber cement materials. Furthermore, methods of reducing the curing time at a substantially lower cost than conventional quick-setting cement formulations, such as high alumina cement, are very desirable.

The best-known and most commonly used accelerant for setting cement is calcium chloride. However, it is widely known in the art that calcium chloride is incompatible with steel-reinforced cements due to its tendency to corrode the steel reinforcement over time in the presence of water and oxygen. Calcium chloride is also sometimes used as an accelerant in fiber cement manufacturing to obtain green strength quickly; however, buildup of chloride ions can also cause corrosion problems in downstream manufacturing processes such as autoclaves. Accordingly, an accelerant for setting concrete and cement composites that does not cause corrosion is needed.

Besides calcium chloride, other accelerants, such as alkaline bases (sodium hydroxide, potassium hydroxide, ammonia, sodium or potassium carbonate, and sodium or potassium silicate), alkaline or alkaline earth metal nitrates, nitrites or carboxylates are all chloride-free with reduced corrosiveness compared to calcium chloride. However, these materials must still be added separately to concrete or cement composite formulations and thus require their own storage vessels, metering apparatus, and mixing/blending processes, either manual or automated, to incorporate them into a composite. On the other hand, it is well known that low-density modifiers for concrete, such as perlite or ceramic microspheres, do not accelerate cement hydration. A single material that provides both an accelerated curing effect and some other desirable function, such as density reduction, in a concrete or cement composite would save considerable time and equipment capital.

There are several well-known organic materials used in cementitous composites and concrete applications. These so called admixtures include cellulose ethers for rheology modification, lignosulfonate or naphthalene sulfonates as water reducing agents and superplasticisers, polymer latexes or emulsions for modifying water absorption properties or improving flexibility, as well as other organic admixtures well known in the art. One typical effect of these admixtures is retarding the setting time of the cement. Often, an accelerant is used to counteract this retarding effect. Accelerants known in the art are corrosive and/or expensive relative to ordinary Portland cement and can add significant cost to a concrete or cement composite formulation.

LeTure et al., in U.S. Pat. No. 5,709,743 disclose a calcium silicate hydrate based accelerant that does not cause corrosion and is as effective as calcium chloride. This material is prepared by hydrating Portland cement to form a calcium silicate hydrate (CSH) material. This CSH material is then finely ground into "crystallization seeds" which accelerate the cure of cement cubes when added in an aqueous suspension to cement. Grinding or milling the calcium silicate particles to a specific particle size (as determined by sedimentation volume) is a crux of the invention described in U.S. Pat. No. 5,709,743. Grinding or milling such particles inherently increases their packing density and thus CSH particles made according to the disclosure of LeTure et al. are unsuitable as a low-density additive.

Another drawback of using the CSH accelerant of LeTure et al. is that it must be added as aqueous slurry. This is a disadvantage for cement composite mixes, such as extrudable cement composites in which the water content is carefully managed to ensure consistent product quality.

One way to achieve green strength quickly in concrete is to use "high early strength" cement, which is ground to a finer particle size and has greater surface area (450 to 600 $m^2/kg$, Blaine method) than standard Portland cement (300 to 400 m²/kg). These fine cements are not suitable for use in the Hatschek process typically used to make fiber cement composites because the fine cement is not retained in the composite during the slurry dewatering process.

In fiber cement manufacture, low-density additives often reduce the strength-to-weight ratios of the fiber cement. Since building materials must meet specific strength criteria, this effect limits the amount of low-density material that can be used in a fiber cement composite.

When a green fiber cement paste is extruded under pressure through a die, the green uncured fiber cement paste tends to "springback" after leaving the extrusion die. The degree of springback is a function of the cement paste rheology, processing history, fiber content and type, air entrainment, and other factors well known in the art. One way to reduce springback is to increase the length of the die, allowing the green fiber cement paste more time to "relax" in its compressed state. However, longer dies are more expensive than shorter dies, and longer dies tend to increase the pressure required to extrude the fiber cement paste. High-pressure extrusion can damage fragile low-density aggregates used in the paste, so a low cost material additive would be a better solution.

Forming concrete underwater, either for repair of existing structures or the building of new structures, often results in the "washout" of fines from the freshly mixed concrete and/or in segregation of the concrete mix. Consequently, most concrete mixes used for underwater placement include a high viscosity cellulose ether material as an anti-washout admixture. However, where large amounts of concrete need to be placed in areas with severe water flow and/or water pressure, such as repair of dams and back filling the annular void behind tunnel linings, the cellulose based anti-washout admixtures can be ineffective in completely preventing washout and segregation, mainly due to its extended delay in cement hydration.

SUMMARY OF THE INVENTION

A first embodiment of the invention provides a low-density calcium silicate hydrate accelerator and strength-enhancing agent for concrete and cement composites, including fiber cement. A second embodiment provides a method of using the low-density calcium silicate hydrate accelerator in Hatschek fiber cement formulations and products. A third embodiment provides a method of using the low-density calcium silicate hydrate accelerator in extruded fiber cement. A fourth embodiment provides a fiber cement formulation containing a low-density calcium silicate hydrate accelerator. A fifth embodiment provides a concrete formulation containing a low-density calcium silicate hydrate accelerator. A sixth embodiment provides a method of using a low-density calcium silicate hydrate to prepare a concrete mixture. A seventh embodiment provides a method accelerating the curing of concrete and cementitious composites, including fiber cement, using low-density calcium silicate hydrate.

As used herein, "CSH" refers to "calcium silicate hydrate." "LD-CSH" refers to "low-density calcium silicate hydrate," also referred to as "low-density CSH." "OPC" refers to "ordinary Portland cement." "FC" refers to "fiber cement" and "FRC" refers to "fiber-reinforced cement," and the two are used interchangeably. The term "Portland cement" includes, but is not limited to, ordinary Portland cement, off-white Portland cement, and blended cement. Cellulose fiber may be hardwood, softwood, or non-wood cellulose fibers. Unless otherwise noted, all percentages are by weight.

Preferred embodiments disclosed herein use a low-density calcium silicate hydrate accelerator for simultaneously reducing both the density and the curing time while enhancing the strength to weight ratio of concrete and cement-containing composites, especially fiber cement.

The low-density calcium silicate hydrate material disclosed herein can be made according to the methods given in U.S. Pat. No. 6,346,146; a portion of which is described below but the whole of which is incorporated by way of reference. Commercially available, synthetic low-density calcium silicate hydrate materials, such as Celite Microcel® A or E (World Minerals, Lompoc, Calif.; used as a filter aid, absorbing agent, and agrochemical carrier) are also useful as low-density accelerants for concrete and cement composites as disclosed herein.

Low-density CSH accelerator has a bulk density of about between 0.015 g/cm³ and 1.5 g/cm³ (15 kg/m³ to 1500 kg/m³). It is equally effective when added to concrete or cement, including fiber cement, composite as a dry powder or as slurry. The low-density CSH has an accelerating effect when added to fiber cement or concrete on a weight basis of about 0.5% to 50%, and more preferably between about 5% and 15% by weight. Preferably, the curing time is accelerated by about 10% or more compared to an equivalent product or formulation made without low-density calcium silicate hydrate. More preferably, the acceleration is about 20% or more. In fact, curing accelerations of about 30%, 40%, 50%, 60%, 70%, or even 80% or more may be realized by incorporating an appropriate amount of low-density CSH.

When used in extrudable fiber cement pastes, low-density CSH overcomes the retarding effects of organic admixtures by accelerating the set time of the fiber cement paste. Low-density CSH overcomes the retarding effects of organic admixtures when added to extrudable fiber cement pastes at levels between 2% and 20% by weight, more preferably between 5% and 15% by weight.

When used in extrudable fiber cement pastes, the low-density CSH also counteracts post-die swelling of the extruded material by accelerating the set time of the fiber cement paste. Low density CSH is effective at reducing post-die swelling when added to extrudable fiber cement pastes at levels between about 2% and 20% by weight, more preferably between about 5% and 15% by weight.

When used to formulate fiber cement composites, low-density CSH enables the production of material with lower density (about 0.6 g/cm³ to 1.2 g/cm³) than traditional fiber cement, with improved strength-to-weight ratio versus fiber cement made without low-density CSH. This effect is observed when low-density CSH is added to fiber cement composites in a range of about 3% to 20%, more preferably in the range of about 3% to 15%.

The low-density calcium silicate hydrate of the preferred embodiments does not contain appreciable amounts of chloride ion. Accordingly, it will not have the corrosive properties of calcium chloride. The low density CSH of the preferred embodiments forms coarse agglomerates in water making it readily retained in wet-process fiber cement operations such as the Hatschek process.

DETAILED DESCRIPTION OF THE PREFERRED EMBODIMENTS

Disclosed herein are cementitious formulations comprising low-density calcium silicate hydrate, products made with these formulations, and methods of making such formulations and products. These formulations and methods are advantageously used, for example, in the Hatschek production process, and in construction applications such as building, road, and bridge repair and construction. Such formulations are also useful in underwater applications where they also exhibit reduced washout. Because the disclosed formulations exhibit reduced setting times and reduced cracking, the cementitious products of these formulations often have lower costs and improved time to market.

Fiber cement mixtures comprising between about 0.5% and 15% by weight low-density calcium silicate hydrate (LD-CSH) curing accelerant are advantageously used in the Hatschek production process. Preferably, the mixture comprises between about 25% and 50% cement, between about 25% and 50% silica ground to about 200-mesh, between about 0% and 15% aggregate, between about 5% and 15% cellulose fiber, between about 0% and 5% additives, between about 0.5% and 15% low-density calcium silicate hydrate, and water. The total water content depends on the consistency required by the Hatschek process. Fiber cement products manufactured from this mixture may have lower-cost, reduced curing times, reduced cracking when curing, and improved time to market. Preferred fiber cement formulations comprising low-density calcium silicate hydrate for use in the Hatschek process are provided in TABLE 1.

TABLE 1

| Ingredient[a] | Range | Example |
| --- | --- | --- |
| Cement | 25–50% | 42% |
| Silica | 25–50% | 33% |
| Aggregate | 0–15% | 0% |
| Cellulose fiber | 5–15% | 11% |
| Additives | 0–5% | 3% |
| Low-density CSH | 0.5–15% | 11% |

[a]Proportions by wt %.

The following ingredients exemplify one preferred embodiment. The cement is ordinary Portland cement to the specifications currently used by conventional Hatschek factories. The silica is 200-mesh ground silica. Preferably, the aggregate is any siliceous aggregate, for example, cenospheres, perlite, fly ash, bottom ash, etc. with particle size ranging from about 50 to 250 microns. The cellulose fiber is, for example, hammer-milled Kraft pulp. The moisture content of the pulp at ambient conditions (approximately 9%) should be taken into account when batching the water. Additives include any compound required to achieve desired properties of the mixture, for example alumina. The low-density CSH is Micro-cel E (World Minerals, Lompoc, Calif.) or the LD-CSH prepared according to EXAMPLES 1 or 2 below. The total water content required depends on the desired consistency of the formulation. For the Hatschek process, typically a slurry of about 5% to 10% solids content provides good processability.

It will appreciated that the cementitious binder, in addition to Portland cement, can also be, but is not limited to, high alumina cement, lime, high phosphate cement, and ground granulated blast furnace slag cement, or mixtures thereof. The aggregate may include, but is not limited to, ground silica sand, amorphous silica, micro-silica, diatomaceous earth, coal combustion fly and bottom ash, rice hull ash, blast furnace slag, granulated slag, steel slag, mineral oxides, mineral hydroxides, clays, magnasite or dolomite, metal oxides and hydroxides, and polymeric beads, mixtures thereof, and other aggregates described above and below. The additives can include, but are not limited to, viscosity modifiers, fire retardants, waterproofing agents, silica fume, geothermal silica, thickeners, pigments, colorants, plasticizers, dispersants, forming agents, flocculents, drainage aids, wet and dry strength aids, silicone materials, aluminum powder, clay, kaolin, alumina trihydrate, mica, metakaolin, calcium carbonate, wollastonite, and polymeric resin emulsion, and mixtures of thereof or other materials.

The cellulose fibers are unrefined/unfibrillated or refined/fibrillated cellulose pulps from various sources, including but not limited to bleached, unbleached, semi-bleached cellulose pulp. The cellulose pulps can be made of softwood, hardwood, agricultural raw materials, recycled waste paper or any other forms of lignocellulosic materials. Cellulose fibers can be made by various pulping methods. In the pulping process wood or other lignocellulosic raw materials such as kenaf, straw, and bamboo, etc., are reduced to a fibrous mass by the means of rupturing the bonds within the structures of lignocellulosic materials. This task can be accomplished chemically, mechanically, thermally, biologically, or by combinations of these treatments. The cellulose fibers used for reinforcing cement composite materials in one embodiment are predominantly individualized fibers with partial or complete removals of lignin components from the fiber cell walls.

Further details regarding fiber cement formulations and cellulose fibers are described in Applicant's copending applications Ser. No. 09/969,742, filed Oct. 2, 2001, and Ser. No. 09/803,456, filed Mar. 6, 2001, the entirety of both of which are hereby incorporated by reference.

Fiber cement mixtures comprising between about 0.5% and 15% by weight low-density CSH are prepared by a method comprising preparing refined pulp slurry; wet grounding silica sand to form a silica slurry; making an low-density CSH slurry; forming a slurry mixture from the above slurries; adding other dry ingredients, such as cement, aggregates, and additives; and adjusting final consistency by adding water as required and mixing.

Figure 1:
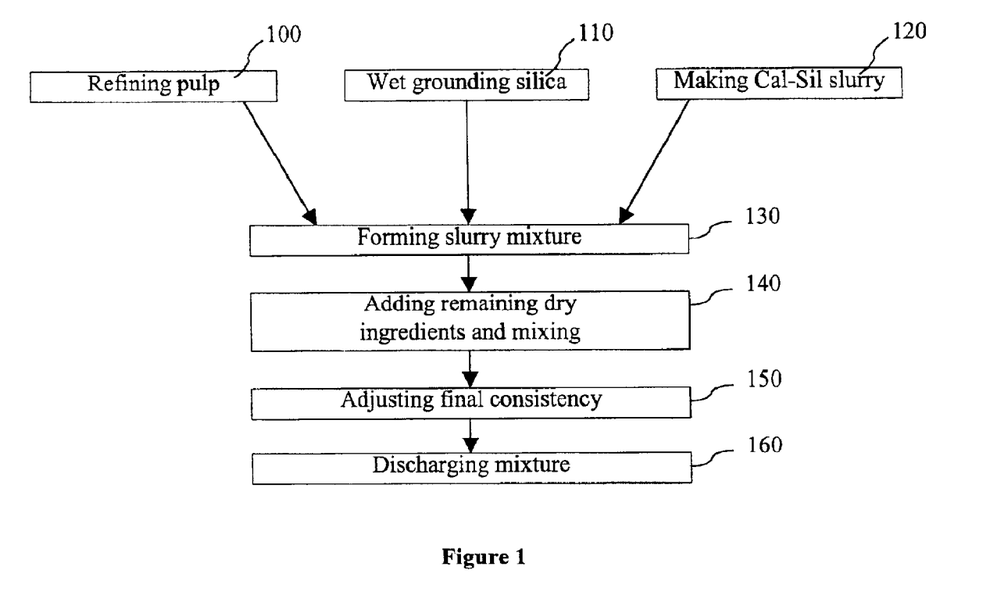
FIG. 1 illustrates a method of making a fiber cement mixture with LD-CSH for the Hatschek process.

FIG. 1 illustrates a preferred method of making a fiber cement mixture comprising low-density calcium silicate hydrate for the Hatschek process. In step 100 ("Refining pulp"), lap type of cellulose fiber pulp is hydrated and refined using a pulp refiner, forming a slurry of refined pulp with a consistency of about 5% to 7%. The slurry is batched in step 130. In step 110 ("Wet grounding silica") silica sand is wet ground using a ball mill to produce a fine silica slurry of approximately 50% consistency. The slurry is batched in step 130. Step 120 ("Making LD-CSH slurry") provides a low-density CSH slurry. Low-density CSH may be prepared in-situ or purchased commercially as a dry powder. Where the low-density CSH is made in-situ, a slurry is typically supplied from the manufacturing section, which is batched in step 130. Where the low-density CSH is dry, for example, CSH purchased commercially, the dry CSH is typically batched and mixed in step 140. In step 130 ("Forming slurry mixture"), the fiber slurry from step 100, the silica slurry from step 110, and the LD-CSH slurry from step 120 are batched according to the required amount as provided in TABLE 1 and added into the mixing tank. The moisture content of the mixture is measured, and the amount of water added in step 150 is adjusted to compensate. In step 140 ("Adding remaining dry ingredients and mixing"), the remaining solid ingredients, for example cement, aggregates, additives, and low-density CSH (if using dry CSH) are weighed out according to TABLE 1 and add into the mixing tank. In step 150 ("Adjusting final consistency"), the solid content of the slurry from step 140 is measured. Additional water may be added to achieve the desired consistency. The resulting slurry is then mixed thoroughly to generate a slurry suitable for sheet formation. In step 160 ("Discharging mixture"), the slurry mixture is discharged and pumped into the sheet formation section, for example, into tubs.

Cementitious mixtures comprising between about 0.5% and 20% by weight low-density calcium silicate hydrate are useful in construction applications, such as construction, road and bridge repair, as well as for underwater applications. Preferably, the cementitious mixture comprises between about 15% and 50% cement; between about 0% and 70% silica, where the silica is quartz sand of about 100 to 400 microns particle size; between about 0% and 40% aggregate; between about 0% and 15% fiber; between about 0% and 2% additives; between about 0% and 0.2% leveling agent; between about 0% and 2% water reducing agent; between about 0% and 1% aeration agent; between about 0.5% and 20% low-density calcium silicate hydrate; and water. The total water content is usually determined by the required water to cement ratio (W/C) for the given application, preferably in a range between about 0.35 and 1. Cementitious products made from this cementitious mixture may have lower-cost, reduced curing times, reduced cracking when curing due to excessive shrinking and high heat of hydration, reduced time to market, and reduced washout in underwater forming applications. Preferred formulations for cementitious mixtures comprising low-density CSH for construction applications are provided in TABLE 2.

TABLE 2

| Ingredient[a] | Range | Example |
| --- | --- | --- |
| Cement | 15–50% | 37.66% |
| Silica | 0–70% | 46.04% |
| Aggregate | 0–40% | 10% |
| Fiber | 0–15% | 0% |
| Additives | 0–2% | 1% |
| Leveling Agent | 0–0.2% | 0% |
| Water Reducing Agent | 0–2% | 0.3% |
| Aeration Agent | 0–1% | 0% |
| Low-density CSH | 0.5–20% | 5% |

[a]Proportions by wt %.

The following ingredients exemplify one preferred embodiment. The cement is ordinary Portland cement to the specifications currently used in conventional construction applications, such as road paving and bridge construction. The silica is, for example, quartz sand of particle size from about 100 to 400 microns. Preferably, the aggregate is any siliceous aggregate, for example, gravels, limestone, bottom ash, etc. of particle size up to about 20 mm. Fiber reinforcement is used in some construction applications depending on the desired properties of the concrete. For example, steel wire or rods, poly-fiber, and carbon fiber are often used in the construction of foundations, bridges, and underwater structures. Additives include any compounds required to achieve desired properties in the mixture, for example, viscosity-enhancing agents (VEAs) for an appropriate water-retention ability and deformability. Examples of VEAs are methylcellulose, hydroxyethylcellulose, hydroxyethylmethylcellulose and hydroxypropylmethylcellulose. Leveling agents are used in self-leveling applications, for example for floors. Examples are Clariant Tylose MH and H. Water reducing agents are, for example, any superplasticiser of the sulfonated melamine formaldehyde (SMF) condensate, sulfonated naphthalene formaldehyde (SNF) condensate, or acrylic polymer (AP) families. Aeration agents are also called air entrainment agents (AEAs), such as AE4. The low-density CSH is Micro-cel E (World Minerals, Lompoc, Calif.) or the LD-CSH prepared according to EXAMPLES 1 or 2 below.

The total water content is adjusted to provide a mix with the desired properties, for example, fluidity and workability. For typical applications, the water to cement ratio (W/C), is preferably in a range of between 0.35 and 1, more preferably 0.45.

These cementitious mixtures comprising between about 0.5% and 20% by weight low-density calcium silicate hydrate for use in construction applications are prepared by a method comprising combining cement, silica, aggregates, additives, and a water reducing agent; dry mixing the ingredients; adding water; mixing; and adding low-density calcium silicate hydrate. In a preferred embodiment, the method further comprises adding fiber, a leveling agent, or an aeration agent, either alone or in combination.

Figure 2:
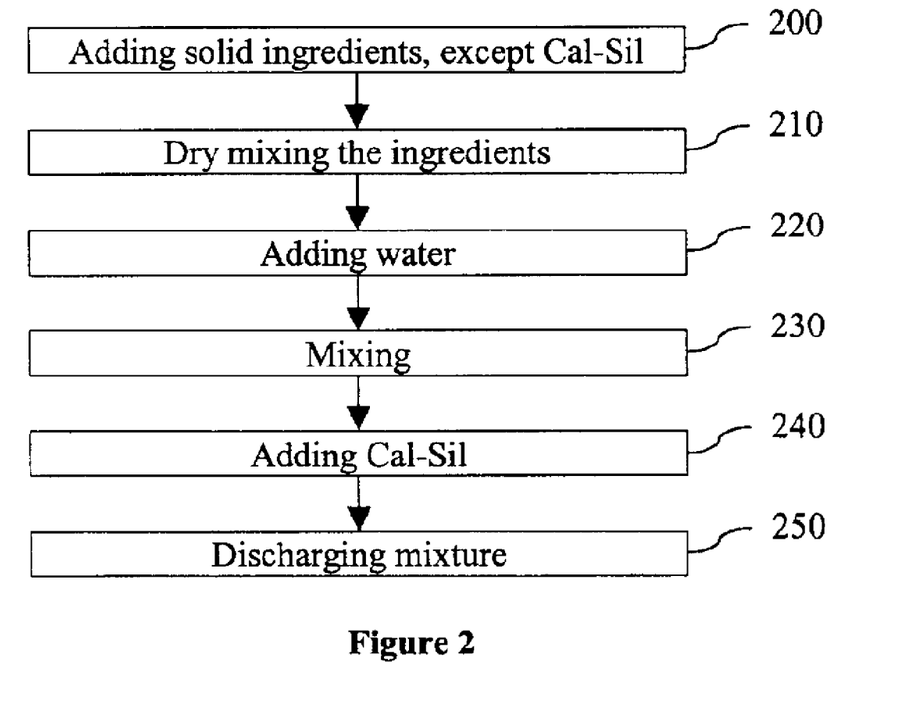
FIG. 2 illustrates a method of making a concrete mixture with LD-CSH for construction applications.

FIG. 2 illustrates an exemplifying method of making cementitious mixtures comprising low-density CSH for construction applications. In step 200 ("Adding solid ingredients, except LD-CSH"), cement, silica, aggregates, fiber, additives, leveling agent, water reducing agent, and aeration agent are weighed-out according to TABLE 2 and added into a mixing machine such as a Hobart mixer. In step 210 ("Dry mixing the ingredients"), the dry ingredients are dry mixed in the mixing machine for a predetermined time, preferably about 1 to 5 minutes. In step 220 ("Adding water"), water is added to the mixture. The amount of water added depends on the consistency required for the particular application. The total water content required to give the desired properties, such as fluidity and workability, is usually determined by the water to cement ratio, W/C, preferably between about 0.35 and 1, more preferably about 0.45. When the batching water is calculated, it is necessary to determine the amount water already present in the solid ingredients, for example in step 200, and subtract that amount. The temperature of the mixture is preferably lower than about 45° C., more preferably about 25° C. The particular temperature depends on factors including the amount of LD-CSH in the mixture, and the type and quantities of other additives such as cellulose ether. In step 230 ("Mixing"), the formulation in the mixing machine is mixed for a predetermined period of time, preferably about 1 to 5 minutes. The temperature of the mixture is preferably lower than about 45° C., more preferably about 25° C. The particular temperature depends on factors including the amount of low-density CSH in the mixture, and the type and quantities of other additives such as cellulose ether. Near the expected time of use, in step 240 ("Adding LD-CSH"), low-density CSH is weighed-out according to TABLE 2 and added to the mixing machine. The formulation is mixed in the mixing machine for a predetermined period of time, preferably about 1 to 5 minutes. The length of time between the addition of the low-density CSH to the mixture (including the mixing time) and the expected time of use must be less than the setting time of the mixture. Accordingly, to prevent the mixture from setting in the truck, the CSH may be added to the mixture using a portable mixing machine at the construction site. The temperature of the mixture is preferably lower than about 45° C., more preferably between about 25 to 30° C. The particular temperature depends on factors including the amount of low-density CSH in the mixture, and the type and quantities of other additives such as cellulose ether. Under high temperature conditions, for example in hot weather, the temperature of the mixture may be controlled by replacing a portion of the water with, for example, ice. In step 250 ("Discharging Mixture"), the mixture is discharged, for example, into construction forms.

Figure 3:
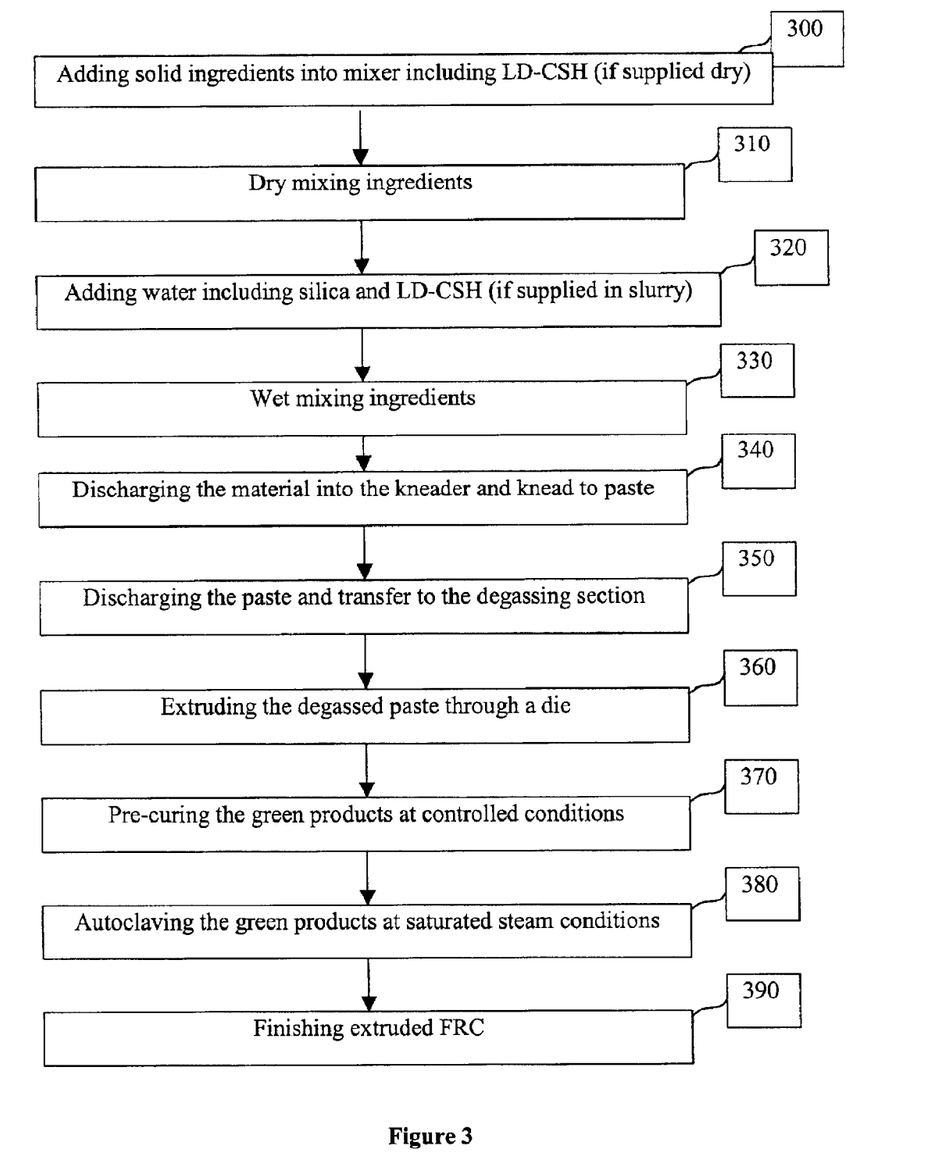
FIG. 3 illustrates a method of making a cementitious mixture with LD-CSH for extruded FRC applications.

FIG. 3 illustrates an example method of making cementitious mixtures comprising low-density CSH for FRC extrusion applications. In step 300 ("Adding solid ingredients including LD-CSH (if supplied dry)"), cement, silica, aggregate, fiber, additives, water reducing agent, and other additives are weighed-out according to TABLE 3 and added into a mixing machine such as an Eirich mixer. In step 310 ("Dry mixing the ingredients"), the dry ingredients are dry mixed in the mixing machine for a predetermined time, preferably about 1 to 5 minutes. In step 320 ("Adding water including silica and LD-CSH (if supplied in slurry)"), water is added to the mixture. The amount of water added depends on the consistency required for the particular application. The amount should be adjusted according to the water content of any silica and LD-CSH slurry if supplied in slurry. The total water content required to give the desired properties, such as fluidity and workability, is usually determined by the water to solid ratio, W/S, preferably between about 0.4 and 1.2, more preferably between about 0.48 and 0.8. When the batching water is calculated, it is necessary to determine the amount water already present in the solid ingredients, for example in step 300, and subtract that amount. The temperature of the mixture is preferably lower than about 45° C., more preferably about 25° C. The particular temperature depends on factors including the amount of LD-CSH in the mixture, and the type and quantities of other additives such as cellulose ether. In step 330 ("Wet mixing ingredients"), the formulation in the mixing machine is mixed for a predetermined period of time, preferably about 1 to 5 minutes. In step 340 ("Discharging the material into the kneader and knead to paste"), the mixture is discharged into a kneader and kneaded for a certain period to form a dough-like paste. In step 350 ("Discharging the paste and transfer to the degassing section"), the paste is then discharged and transferred to the degassing section of the extruder for degassing under vacuum. In step 360 ("Extruding the degassed pasted through a die"), the paste is fed into the extruder auger and extruded through a die to form a green product. In step 370 ("Pre-curing the green products at controlled conditions"), the green product is precured under controlled conditions for a certain period of time, preferably at about 50° C. and about 80% relative humidity. In step 380 ("Autoclaving the green products at saturated steam conditions"), products are loaded into an autoclave and steam-cured at about 180° C. for about 8 hours. In step 390 ("Finishing extruded FRC"), the products are finished with sanding or painting on the surface as required.

TABLE 3

| Ingredient[a] | Range | Example |
|---|---|---|
| Cement | 15–60% | 44.5% |
| Silica | 0–60% | 29.7% |
| Aggregate | 0–40% | 10% |
| Fiber (including synthetic fiber) | 0–15% | 9% |
| Additives | 0–2% | 0% |
| Viscosity Enhancing Agent | 0.2–3% | 1.5% |
| Water Reducing Agent | 0–2% | 0.3% |
| Aeration Agent | 0–1% | 0% |
| Low-density CSH | 2–20% | 5% |

[a]Proportions by wt %.

The following ingredients exemplify one preferred embodiment. The cement is ordinary Portland cement to the specifications currently used by conventional extrusion processes. The silica is 200-mesh ground silica. Preferably, the aggregate may be any siliceous aggregate, for example, cenospheres, perlite, fly ash, bottom ash, etc., with particle size ranging from about 50 to 250 microns. Fibers may be cellulose fibers or synthetic polymer fibers. The cellulose fiber is, for example, hammer-milled Kraft pulp. The moisture content of the pulp at ambient conditions (approximately 9%) should be taken into account when batching the water. Additives include any compound required to achieve desired properties of the mixture, for example alumina. The low-density CSH is Micro-cel E (World Minerals, Lompoc, Calif.) or the LD-CSH prepared according to EXAMPLES 1 or 2 below. The total water content required depends on the desired consistency of the formulation.

EXAMPLES

Two examples of the low-density calcium silicate hydrate used herein are prepared according the method described in U.S. Pat. No. 6,346,146, a portion of which is described below but the whole of which is incorporated by way of reference.

Example 1

Preparing Low-Density CSH.

Process lime water is weighed into the batch tank at a ratio of 6.0 L water per kg of lime (CaO) in the batch. It should be noted that the present example process is suitable for use with both fresh town water or process water. The water is discharged into the mixing tank and then heated with steam to about 65° C. The steam adds extra water. A 1300 kg batch of raw materials requires about 628 kg of lime which is slaked in about 3767 L of lime water and about 672 kg dry weight of ground quartz sand in a slurry at about 40% solids which is added to the slaked lime in a stirred tank.

The ground quartz sand is prepared as follows. Quartz sand is ground in a vertical stirred ball mill to a particle size such that 90% of the volume of the silica has a diameter of less than about 11.6 microns as measured by a Malvern "Mastersizer" laser diffraction particle size analyzer.

The slurry is mixed for about 15 minutes then pumped into the stirred pressure vessel. Water is added to modify the viscosity of the slurry. The slurry is heated with steam to a pressure of about 700±50 kPa. The reaction is maintained at this pressure by addition of steam into the vessel. The material is maintained at pressure for about 3 hours by further intermittent injections of steam. After about 3 hours at full pressure, the pressure is then blown-off to about 270 kPa in 30 minutes. The material is then discharged into a tank via a cyclone to allow the liberation of steam from the slurry. The slurry is then diluted with lime water to between about 10–12 wt % dry solids of low-density CSH product and pumped to a stirred storage tank.

Example 2

Preparing Low-Density CSH with Milled Silica

The example below describes the conversion of lime and ground quartz silica into low-density CSH of predominantly the tobermorite phase with a reaction time of only about 2 hours with no greater than about 10% unreacted silica.

Silica sand of average particle size between 0.3 and 0.5 mm is ground in a vertical stirred ball mill to a particle size of about $D[90]=8.84$ μm. $D[90]$ represents the particle diameter that 90% weight of silica is less than, as measured by a Malvern "Mastersizer" particle size analyzer.

The lime and milled silica are then mixed into an aqueous slurry in a stirred pressure vessel. The molar ratio of lime to silica is about 1:1. Water is added to give a dry solids concentration of 4%±1%. The reaction is heated from ambient to 170±5° C. in about 40 minutes with a steam pressure of 750±50 kPa. The stirred pressure vessel is maintained under these conditions for about 2 hours.

Properties of the calcium silicate hydrate as synthesized in EXAMPLES 1 and 2 as well as commercially available CSH are provided below. TABLE 4 provides physical properties of various low-density CSH materials. TABLE 5 provides typical chemical analyses of low-density CSH materials.

TABLE 4

| Property | CSH of Example 1 | CSH of Example 2 | Celite Micro-cel E ® |
|---|---|---|---|
| Unreacted Silica | 7.5% | 4.1% | 0.1% |
| Tamped Dry Bulk Density | 217 kg/m³ | 84 kg/m³ | 180 kg/m³ |

TABLE 5

| Material | $SiO_2$ | CaO | $Al_2O_3$ | $Fe_2O_3$ | MgO | $Na_2O + K_2O$ | LOI[a] |
|---|---|---|---|---|---|---|---|
| CSH of Example 1 | 49 | 29 | 3 | 0.7 | 0.7 | 2.2 | 15 |
| Micro-cel E | 47 | 32 | 2.5 | 0.7 | 2.2 | 1.3 | 15 |

Percentages by weight.
[a]Loss on ignition.

The use of low-density calcium silicate hydrate as an accelerant is illustrated in the following examples.

Example 3

Accelerated Cure of Green Fiber Cement Pastes

Three fiber cement pastes of equal dry density (about 0.85 g/cm³) were formed from ordinary Portland cement (OPC Type I, TXI), 200-mesh, ground silica, refined cellulose fiber (bleached kraft pulp, Weyerhaeuser), water, and a low-density additive. The low density additive—hollow ceramic microspheres and/or dry, low-density CSH (Micro-cel E®, World Minerals, Lompoc, Calif.)—was added to achieve the target density. To prepare the paste, 300 grams of the dry components proportioned according to TABLE 6 were mixed together in an Eirich R-02 high-shear mixer for about 3 minutes. Water was added to the mixture to form a paste, and the mixture was mixed for an additional 2 minutes. The paste was transferred to a Hobart-type mixer and kneaded for 2 to 3 minutes to further homogenize the paste. A sample of each paste was placed in a 200-mL plastic bottle and an RTD thermocouple was inserted in the mixture. The container was sealed and placed in a calorimeter (Calorimetre de Langvant) located in an incubating room held at 22° C.

TABLE 6

| Formulation | Portland Cement | 200-mesh Ground Silica | Cellulose Fiber | Hollow Ceramic Spheres | Low-density CSH | Water[a] |
|---|---|---|---|---|---|---|
| A | 39 | 39 | 11 | 0 | 11 | 71 |
| B | 39 | 39 | 11 | 6 | 5 | 64 |
| C | 39 | 39 | 11 | 11 | 0 | 56 |

Dry components by wt % of total dry weight.
[a]Percent water added based on total weight of dry components to maintain consistent paste workability.

Figure 4:
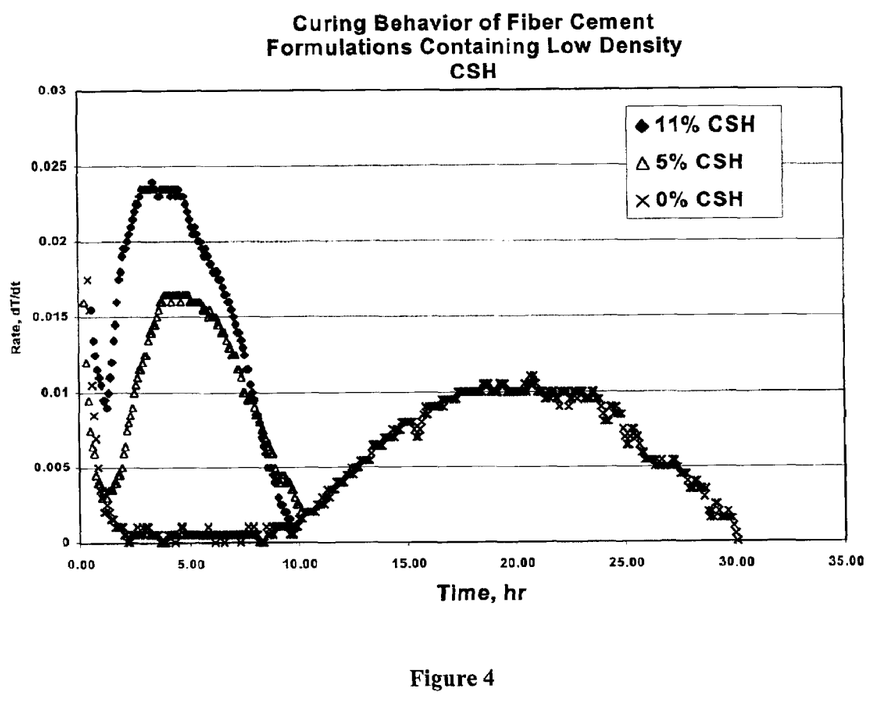
FIG. 4 illustrates the curing behavior of fiber cement formulations containing low-density calcium silicate hydrate (LD-CSH).

Temperature and time data were collected as each sample cured and are plotted in FIG. 4. For each sample, the time of the maximum temperature ($T_{max}$) and the time of the maximum rate of temperature increase ($T_{maxrate}$) were recorded. As shown in TABLE 7, $T_{max}$ decreased with increasing CSH, showing the accelerating effect of low-density CSH in fiber cement formulations. Formulation A (11% LD-CSH) reached $T_{max}$ about 70% faster than formulation C (no LD-CSH). Formulation B (5% LD-CSH+ ceramic spheres) reached $T_{max}$ about 60% faster than formulation A. For $T_{maxrate}$, the values are about 80% faster for formulation A, and about 75% faster for formulation B.

TABLE 7

| Formulation | $T_{max}$ (hours)[a] | $T_{maxrate}$ (hours)[b] |
|---|---|---|
| A | 9.5 | 3.6 |
| B | 11.2 | 4.9 |
| C | 30.1 | 19.9 |

[a]Time of the maximum temperature.
[b]Time of the maximum rate of temperature increase.

Example 4

Accelerated Cure of Concrete Formulations Using Low-Density CSH

Concrete pastes, without fiber, were prepared according to TABLE 8. Portland cement (Blue Circle Southern), natural raw sand (0.24 mm to 4 mm), and high-range water reducer (HRWR, Melmet® F-15, SKW Chemical) were blended with either calcium chloride powder (AR grade, Aldrich Chemical) or dry, low-density CSH (Micro-cel E®, World Minerals, Lompoc, Calif.). The dry components were mixed in an Eirich R-02 mixer for about 1 minute, then transferred to a Hobart mixer and blended with water to achieve similar paste workability.

TABLE 8

| Formulation | Portland Cement | Natural Raw Sand, 0.24–4 mm | HRWR | CaCl$_2$ | LD-CSH | Water[b] |
|---|---|---|---|---|---|---|
| D | 200 | 800 | 3 | 0 | 55 | 205 |
| E | 200 | 800 | 3 | 2 | 0 | 100 |
| F | 200 | 800 | 3 | 0 | 0 | 100 |

Quantities in grams.
[a]High-range water reducer.
[b]Water adjusted to maintain consistent paste workability.

Once mixed, a sample of each concrete paste formulation was placed in a 200-mL plastic bottle with an RTD thermocouple and the bottles placed in a calorimeter (Calorimetre de Langvant) located in a curing room at 22° C. Time and temperature data were collected as described in EXAMPLE 3. TABLE 9 indicates that low-density CSH compares favorably to CaCl$_2$ with respect to accelerating the curing of concrete. Formulation D (5.1% LD-CSH) reached $T_{max}$ about 65% faster than formulation F (no LD-CSH), and $T_{maxrate}$ about 80% faster.

TABLE 9

| Formulation | $T_{max}$ (hours)[a] | $T_{maxrate}$ (hours)[b] |
|---|---|---|
| D | 10.5 | 5 |
| E | 19.5 | 15 |
| F | 31.3 | 25.4 |

[a]Time of the maximum temperature.
[b]Time of the maximum rate of temperature increase.

Example 5

Effect of Low-Density CSH on Cure Behavior of Extruded Fiber Cement with Organic Admixtures Extrudable fiber cement pastes were prepared according to TABLE 10. Cement, silica, fiber, and calcium chloride were obtained from the sources listed in the previous examples. In these tests, organic admixtures VEA (a proprietary grade of methylhydroxyethylcellulose, Shin-Etsu Chemical) and DA (Melmet F-15, SKW Chemical) were added to improve the paste rheology and workability. The solid components were blended in a high-speed Eirich R-02 mixer and subsequently mixed with water in a Hobart mixer. The paste produced was then extruded as square edged sheets, 50 mm wide by 10 mm thick, using a Handle laboratory extruder with a 75-mm barrel.

Paste setting times and temperatures were recorded as in EXAMPLES 3 and 4 using RTD thermocouples embedded in approximately 200 mL of the extruded paste. As shown in TABLE 11, 3% low-density CSH effectively accelerates the setting time of extrudable fiber cement pastes with relatively high loadings of organic admixtures. The magnitude of the acceleration is comparable to the effect of calcium chloride. Comparing formulations H (no LD-CSH) and I (3% LD-CSH), $T_{max}$ was reached about 65% faster and $T_{maxrate}$ about 70% faster. For formulations G (no LD-CSH) and J (3% LD-CSH), the values are about 55% faster to $T_{max}$ and about 60% faster to $T_{maxrate}$ for the LD-CSH containing formulation.

TABLE 11

| Y | $T_{max}$ (hours)[a] | $T_{maxrate}$ (hours)[b] |
|---|---|---|
| G | 60 | 46 |
| H | 82 | 69.5 |
| I | 28 | 19 |
| J | 26 | 17 |
| G + 1 wt % CaCl$_2$ | 26.6 | 22 |

[a]Time of the maximum temperature.
[b]Time of the maximum rate of temperature increase.

Example 6

Comparison of the Acceleration Effects of the Low-Density CSH of Example 1 to Micro-Cel E Extrudable fiber cement paste samples were prepared using the method described in EXAMPLE 5 according to the proportions of TABLE 12. Formulations containing equal amounts of the low-density CSH prepared in EXAMPLE 1 and Micro-cel E were compared to a formulation containing no low density CSH. Extruded planks, 89 mm wide by 25 mm thick, of each formulation were placed in a curing chamber maintained at 50° C. and 80% relative humidity. Planks were considered "set" when they could support a 75 kg load without deforming. As shown in TABLE 13, both types of low-density CSH accelerated the setting time by about 80%.

TABLE 10

| Formulation | Portland Cement | 200-mesh Ground Silica | Cellulose Fiber | VEA | DA | Hollow Ceramic Spheres | Low-density CSH[a] | Water[b] |
|---|---|---|---|---|---|---|---|---|
| G | 41.7 | 27.8 | 9 | 1.5 | 0 | 20 | 0 | 56 |
| H | 41.5 | 27.7 | 9 | 1.5 | 0.3 | 20 | 0 | 56 |
| I | 39.7 | 26.5 | 9 | 1.5 | 0.3 | 20 | 3 | 56 |
| J | 39.9 | 26.6 | 9 | 1.5 | 0 | 20 | 3 | 56 |
| G + 1 wt % CaCl$_2$ | 41.7 | 27.8 | 9 | 1.5 | 0 | 20 | 0 | 56 |

Dry components by wt % of total dry weight.
[a]Micro-cel® E.
[b]Percent water added based on total weight of dry components to maintain consistent paste workability.

TABLE 12

| Formulation | Portland Cement | 200-mesh Ground Silica | Cellulose Fiber | VEA | DA | Hollow Ceramic Spheres | Low-density CSH | Water[a] |
|---|---|---|---|---|---|---|---|---|
| K | 38.5 | 25.7 | 9 | 1.5 | 0.3 | 25 | 0 | 54 |
| L | 35.5 | 23.7 | 9 | 1.5 | 0.3 | 25 | 5[b] | 54 |
| M | 35.5 | 23.7 | 9 | 1.5 | 0.3 | 25 | 5[c] | 54 |

Dry components by wt % of total dry weight.
[a]Percent water added based on total weight of dry components to maintain consistent paste workability.
[b]Low-density CSH of EXAMPLE 1.
[c]Micro-cel® E low-density CSH.

TABLE 13

| Formulation | Time to set (hrs) |
|---|---|
| K | 35 |
| L | 6 |
| M | 6 |

Example 7

Effect of Low-Density Fiber Cement on After-Die Dimensional Stability of Fiber Cement Pastes

Extrudable fiber cement pastes were prepared in the manner of EXAMPLE 5, using the same ingredients. Low density CSH was substituted for cement and ground silica, maintaining a 6:4 ratio between cement and ground silica. Planks 89 mm wide by 25 mm thick were extruded from a Handle laboratory extruder with a 75-mm barrel and allowed to set for 12 hours at 50° C. and 80% relative humidity. The planks were then autoclaved in saturated steam at 180° C. for 8 hours. The planks were cut into sections and the cross-sectional area of each section was measured. The percent increase for each cross-sectional area after autoclaving was determined. Results are tabulated in TABLE 13 as a function of low-density CSH content.

TABLE 14

| Low-density CSH (wt %) | Increased cross-sectional area (%) |
|---|---|
| 0 | ~15–20 |
| 1 | 8.4 |
| 2 | 6.5 |
| 3 | 5 |
| 4 | 6.5 |
| 5 | 6 |
| 10 | ~2 |

These results show that accelerating the setting time of the green fiber-cement paste has beneficial effect on post-die swelling.

Example 8

Effect of Low-Density CSH on Strength-To-Weight Ratio of Extruded Fiber Cement

Fiber cement pastes of were prepared using the materials, except for the LD-CSH, and methods of EXAMPLE 5, according to TABLE 15.

TABLE 15

| Formulation | Portland Cement | 200-mesh Ground Silica | Cellulose Fiber | VEA | DA | Low-density CSH[a] | Water[b] |
|---|---|---|---|---|---|---|---|
| N | 49.3 | 32.9 | 11 | 1.5 | 0.3 | 0 | 41.8 |
| O | 45.6 | 30.4 | 11 | 1.67 | 0.3 | 11 | 62.6 |
| P | 42.9 | 28.6 | 11 | 2.2 | 0.3 | 15 | 68.9 |
| Q | 39.9 | 26.85 | 11 | 2.25 | 0.3 | 20 | 83.5 |
| R | 33.1 | 22.1 | 11 | 3.5 | 0.3 | 30 | 116 |
| S | 27.5 | 18.3 | 11 | 3.92 | 0.3 | 50 | 144 |

Dry components by wt % of total dry weight.
[a]Low-density CSH of EXAMPLE 1.
[b]Percent water added based on total weight of dry components to make pastes of equivalent consistency and workability.

Once mixed and homogenized, each formulation was extruded through a rectangular die into planks 10 mm thick by 50 mm wide using a Handle laboratory extruder with a 75 mm barrel. Planks of each formulation were cut from the extruded material as it exited the die, allowed to set for 12 hours, and cured in an autoclave at 180° C. steam for 12 hours. After curing, planks were cut into test specimens, measured, and weighed to determine the dry density (D) and placed in a MTS mechanical tester to determine ultimate tensile strength. Strength-to-weight ratio was determined by dividing ultimate tensile strength by the formulation density. As shown in TABLE 15, formulations using low-density CSH can attain higher strength-to-weight ratios than denser materials containing no low-density CSH. Low-density CSH content can be adjusted to maximize the strength to weight ratio of a given fiber cement formulation:

TABLE 15

| Formulation | Density (g/cm³) | Ultimate stress (MPa)/Density |
|---|---|---|
| N | 1.28 | 5.65 |
| O | 1.08 | 7.32 |
| P | 1.00 | 6.27 |
| Q | 0.87 | 7.01 |
| R | 0.66 | 5.28 |
| S | 0.57 | 2.63 |

The embodiments illustrated and described above are provided as examples of certain preferred embodiments of the present invention. Various changes and modifications can be made to the embodiments presented herein by those skilled in the art without departure from the spirit and scope of this invention, the scope of which is limited only the claims appended hereto.

What is claimed is:

1. A method of forming a cementitious material, comprising:
    preparing a formulation comprising a cementitious binder and aggregate;
    adding to the formulation a quantity of low density calcium silicate hydrate sufficient to reduce the curing time of the formulation as compared to an equivalent formulation without calcium silicate hydrate, wherein the low bulk density calcium silicate hydrate is added as a powder and comprises from about 0.5% to about 50% by weight of the formulation; and
    curing the formulation for a time sufficient to cause the material to set;
    wherein the formulation sets in a period of time that is at least 10% less than the time it would take an equivalent formulation without calcium silicate hydrate to set, and
    wherein the bulk density of the low bulk density calcium silicate hydrate is between about 0.015 g/cm³ and about 1.5 g/cm³.

2. The method of claim 1, wherein the formulation sets in a period of time that is at least 20% less than the time it would take an equivalent formulation without calcium silicate hydrate to set.

3. The method of claim 1, wherein the cementitious material comprises sufficient low bulk density calcium silicate hydrate to produce a cured product of density between about 0.6 g/cm³ and 1.2 g/cm³.

4. The method of claim 1, comprising forming the material using the Hatschek production process.

5. The method of claim 4, wherein preparing the formulation comprises mixing a slurry of cellulose fiber pulp with a slurry of silica to form a mixture, and adding cement to the mixture.

6. The method of claim 5, further comprising adding additional aggregates and additives to the mixture.

7. The method of claim 1, comprising forming the material into articles for building and construction applications.

8. The method of claim 7, wherein the material is formed into a concrete article.

9. The method of claim 8, wherein preparing the formulation comprises making a mixture by adding cement, silica and aggregate into a mixing machine and dry mixing the mixture.

10. The method of claim 9, further comprising adding fiber reinforcement to the mixture.

11. The method of claim 10, wherein the fiber reinforcement is selected from the group consisting of steel wire, steel rods, polymer fiber, cellulose fiber, and carbon fiber.

12. The method of claim 9, wherein the silica is quartz sand.

13. The method of claim 9, wherein the aggregate is selected from the group consisting of natural rock, sand, gravel, limestone and bottom ash.

14. The method of claim 9, further comprising adding water to the mixture and mixing the mixture.

15. The method of claim 14, wherein adding the calcium silicate hydrate accelerant to the formulation occurs after mixing the mixture with water.

16. The method of claim 15, further comprising mixing the mixture having calcium silicate hydrate.

17. The method of claim 8, wherein the low bulk density calcium silicate hydrate accelerant is added to the cementitious mixture after the cementitous mixture has been transported to its place of intended use.

18. The method of claim 1, wherein the formulation is formed into a green article by extrusion.

19. The method of claim 18, wherein preparing the formulation comprises making a mixture by adding cement, silica, and fibers into a mixing machine, and dry mixing the mixture.

20. The method of claim 19, wherein the formulation further comprises a siliceous aggregate in addition to the silica.

21. The method of claim 18, wherein the fibers are selected from the group consisting of cellulose fibers, synthetic polymer fibers, and a combination of both.

22. The method of claim 18, further comprising adding organic admixtures to the mixture.

23. The method of claim 19, further comprising adding water to the mixture, and mixing the mixture with the water.

24. The method of claim 23, wherein the calcium silicate hydrate is added to the mixture in dry form before adding water, and the calcium silicate hydrate is dry mixed with the mixture.

25. The method of claim 23, further comprising discharging the mixture into a kneader and kneading the mixture into a paste.

26. The method of claim 25, wherein the paste is degassed under vacuum.

27. The method of claim 25, wherein the paste is extruded through a die to form a green article.

28. The method of claim 25, wherein the water-solid-ratio of the paste is between about 0.4 to 1.2.

29. The method of claim 27, comprising precuring the mixture for a predetermined period of time.

30. The method of claim 27, further comprising autoclaving the green article.

31. In a method for accelerating the curing of an extruded cementitious article, the improvement comprising adding a quantity of low bulk density calcium silicate hydrate to a formulation used to produce the article sufficient to accelerate the curing of the cementitious article as compared to an equivalent formulation made without low bulk density calcium silicate hydrate, wherein the bulk density of the low bulk density calcium silicate hydrate is between about 0.015 g/cm³ and about 1.5 g/cm³, and wherein the low bulk density calcium silicate hydrate is added as a powder and comprises from about 0.5% to about 50% by weight of the formulation.

32. In a method for accelerating the curing of a cementitious article cured underwater, the improvement comprising adding a quantity of low bulk density calcium silicate hydrate to a formulation used to produce the article sufficient to accelerate the curing of the cementitious article compared to an equivalent formulation made without low bulk density calcium silicate hydrate, wherein the bulk density of the low bulk density calcium silicate hydrate is between about 0.015 g/cm³ and about 1.5 g/cm³, and wherein the low bulk density calcium silicate hydrate is ddded as a powder and comprises from about 0.5% to about 50% by weight of the formulation.

33. The method of claim 1, wherein the formulation comprises a quantity of the low bulk density calcium silicate hydrate accelerant sufficient to accelerate the curing of the formulation by about 50% or more compared to an equivalent formulation without low bulk density calcium silicate hydrate.

34. The method of claim 1, wherein the formulation comprises sufficient low bulk density calcium silicate hydrate accelerant to produce a product of density between about 0.6 g/cm³ and about 1.2 g/cm³, and wherein the strength-to-weight ratio of the product is higher compared to an equivalent product without low bulk density calcium silicate hydrate.

35. The method of claim 34, wherein the formulation is used to make articles for building and construction applications.

36. The method of claim 34, wherein the formulation is used in the Hatschek process.

37. The method of claim 36, wherein the formulation further comprises between about 5% and about 15% cellulose fibers.

38. The method of claim 36, wherein the formulation comprises between about 0.5% and about 15% low bulk density calcium silicate hydrate.

39. The method of claim 36, wherein the formulation comprises between about 25% and about 50% Portland cement.

40. The method of claim 36, wherein the formulation comprises between about 25% and about 50% silica.

41. The method of claim 36, wherein the formulation comprises the silica is ground to about 200-mesh.

42. The method of claim 36, wherein the aggregate is silica, and further comprising up to about 40% of an additional aggregate.

43. The method of claim 42, wherein the additional aggregated is a siliceous aggregate.

44. The method of claim 43, wherein the additional aggregate is selected from the group consisting of cenospheres, perlite, vermiculite, volcanic ash, fly ash and bottom ash.

45. The method of claim 36, wherein the formulation further comprises up to about 5% additives.

46. The method of claim 45, wherein the additives are selected from the group consisting of alumina, pigments, colorants, flocculants, drainage aids, silicone materials, clays, mica, wollastonite, calcium carbonate and fire retardants.

47. The method of claim 1, wherein the formulation is made into an extrudable paste.

48. The method of claim 47, wherein the formulation comprises between about 2% and about 20% low bulk density calcium silicate hydrate.

49. The method of claim 47, wherein the formulation comprises between about 5% and about 15% low bulk density calcium silicate hydrate.

50. The method of claim 47, wherein the formulation comprises sufficient low bulk density calcium silicate hydrate accelerant to reduce post-die swelling to less than about 6.5% as measured by increase in cross-sectional area.

51. The method of claim 47, wherein the formulation comprises between about 15% and about 60% Portland cement.

52. The method of claim 47, wherein the formulation comprises up to about 60% silica.

53. The method of claim 52, wherein the silica is about 200-mesh ground silica.

54. The method of claim 47, wherein the aggregate is silica, and wherein the formulation further comprises up to about 40% of an additional aggregate.

55. The method of claim 54, wherein the additional aggregate is a siliceous aggregate.

56. The method of claim 55, wherein the additional aggregate is selected from the group consisting of cenospheres, perlite, vermiculite, volcanic ash, fly ash and bottom ash.

57. The method of claim 55, wherein the additional aggregate has a particle size between about 50 and about 250 microns.

58. The method of claim 47, wherein the formulation further comprises up to about 15% fibers.

59. The method of claim 58, wherein the fibers are cellulose.

60. The method of claim 58, wherein the fibers are synthetic.

61. The method of claim 47, wherein the formulation further comprises up to about 2% additives.

62. The method of claim 61, wherein the additives are selected from the group consisting of alumina, pigments, colorants, surfactants, silicone materials, clays, mica, wollastonite, calcium carbonate and fire retardants.

63. The method of claim 47, wherein the formulation further comprises comprising between about 0.2% and about 3% of a viscosity enhancing agent.

64. The method of claim 63, wherein the viscosity enhancing agent is selected from the group consisting of methylcellulose, hydroxyethylcellulose, hydroxyethylmethylcellulose and hydroxypropylmethylcellulose.

65. The method of claim 47, wherein the formulation further comprises up to about 2% of a water reducing agent.

66. The method of claim 47, wherein the formulation further comprises up to about 1% of an aeration agent.

67. The method of claim 1, wherein the formulation is used to make concrete.

68. The method of claim 67, wherein the formulation comprises between about 0.5% and about 20% low bulk density calcium silicate hydrate.

69. The method of claim 67, wherein the formulation comprises a quantity of the low bulk density calcium silicate hydrate accelerant sufficient to accelerate the curing of the formulation by at least about 65% compared to an equivalent formulation without low bulk density calcium silicate hydrate.

70. The method of claim 67, wherein the formulation comprises between about 15% and about 50% Portland cement.

71. The method of claim 67, wherein the formulation comprises between about 0% and about 70% silica.

72. The method of claim 71, wherein the silica is quartz sand.

73. The method of claim 72, wherein the quartz sand has a particle size of about 100 to about 400 microns.

74. The method of claim 67, wherein the aggregate is silica, and wherein the formulation further comprises up to about 40% of an additional aggregate.

75. The method of claim 74, wherein the additional aggregate is a siliceous aggregate.

76. The method of claim 75, wherein the additional aggregate is selected from the group consisting of natural rock, sand, gravel, limestone and bottom ash.

77. The method of claim 67, wherein the formulation further comprises up to about 15% fiber reinforcement.

78. The method of claim 77, wherein the fiber reinforcement is selected from the group consisting of steel wire, steel rods, synthetic polymer fiber, cellulose fiber, carbon fiber, and combinations thereof.

79. The method of claim 67, wherein the formulation further comprises up to about 2% additives.

80. The method of claim 79, wherein the additives include a viscosity enhancing agent.

81. The method of claim 80, wherein the viscosity enhancing agent is selected from the group consisting of methylcellulose, hydroxyethylcellulose, hydroxyethylmethylcellulose and hydroxypropylmethylcellulose.

82. The method of claim 67, wherein the formulation further comprises up to about 0.2% of a leveling agent.

83. The method of claim 67, wherein the formulation further comprises up to about 2% of a water reducing agent.

84. The method of claim 67, wherein the formulation further comprises up to about 1% of an aeration agent.

85. The method of claim 67, wherein the formulation further comprises water, and wherein the water-to-cement ratio in the formulation is between about 0.35 and 1.

* * * * *